June 4, 1963  P. E. SMITH, JR., ETAL  3,092,742
MOTOR POSITIONING DEVICE
Original Filed April 9, 1956  6 Sheets-Sheet 2

INVENTORS
Paul E. Smith Jr. and
BY Hans A. Dudler
EZEKIEL WOLF, WOLF & GREENFIELD
their attorney

United States Patent Office 3,092,742
Patented June 4, 1963

3,092,742
MOTOR POSITIONING DEVICE
Paul E. Smith, Jr., Littleton, Mass., and Hans A. Dudler, Zurich, Switzerland, assignors to Conval Corporation, Cambridge, Mass., a corporation of Massachusetts
Original application Apr. 9, 1956, Ser. No. 576,928, now Patent No. 2,948,839, dated Aug. 9, 1960. Divided and this application Feb. 18, 1960, Ser. No. 9,465
8 Claims. (Cl. 310—68)

This is a divisional application of application Serial No. 576,928, now Patent No. 2,948,839, and relates to a positioning device and control means for supplying an input electrical signal to the positioning device, with the input electrical signal being derived in the control means from a selected external variable.

The present invention is a further improvement and extension of copending patent application Serial No. 534,020, filed September 13, 1955, now Patent No. 2,948,295, dated August 9, 1960.

In the present invention there is provided an electrically operated positioning device adapted to position a variety of elements such as valves, guide bars, rods, cutting edges, potentiometers, resolvers, or other elements, used in computing devices to be used in analog computation or in analog digital data conversion, or in the various moving parts of automatic machine tools, such as milling machine heads, table and/or tool holders. In addition to these uses, the positioning device and its control system may be used for any application where translational motion control of a particular object is desired.

In the present invention, however, the mechanical and electrical arrangements are described in connection with their use as a valve control for which the invention is particularly adapted. If, however, other applications of the invention are to be made, the valve stem may readily be replaced by a suitable linkage or gearing system so as to control the operation of some other desired implement, such as a roll, carriage, potentiometer, or other element being positioned.

In the present invention, the positioning device is provided with mechanical means electrically operative of unique and efficient design, so arranged as to provide a greatly improved positioning device which permits a more accurate and responsive positioning to a given signal than heretofore has been obtained. Broadly speaking, the present invention provides an electrical controller unit and a positioner unit having a mechanical structure operatively controlled by an electrical circuit (defined hereinafter as the electrical positioner circuit so as to distinguish it from the electrical controller circuit).

In the positioner unit there is provided an improved means of limiting the reciprocal limits and motions of the actuating element or stem connected to the valve or other controlled element as well as improved means for providing a braking to the input power so as to avoid over-running.

The present invention also provides a "fail-safe" system in which the mechanical structure will always remain in either a chosen open or closed position in the event that there is a power failure and current to the system is thereby cut off.

There is also provided in the present invention, a control device or means of improved design. This control device is designed to receive a constant or variable input signal and compare it with a desired constant or variable input level, so as to obtain a selected output signal which is used as an input to a second stage, with the second stage or electrical positioner circuit directly controlling the operation of the mechanical structure.

The control device itself provides a stable and efficient system for supplying a constant or intermittent controlling signal to the positioner unit and is particularly adapted to receive widely varying variable input signals representative of actual parameter values which signals are compared with a variable or fixed reference desired signal representative of a value for that parameter.

In the operation of this control device, preferably three signals are in fact, utilized for the purpose of obtaining the desired signal. These signals are an integral, proportional, and derivative signal, with each derived from the error signal representative of the deviation of the actual signal from the desired signal. These three signals, integral, proportional, derivative, are summed within the control device, and the summation is used as the input to the electrical positioner circuit controlling the mechanical structure. In addition to the features of the control device set forth above, there is also provided means in the control device for selecting a zero center, and for manual operation of the controller in such a way that the controller may be switched from manual to automatic without any noticeable effect in the electrical system taking place. Other features and advantages of the present invention will be considered in connection with the accompanying drawing, in which:

Figure 11:
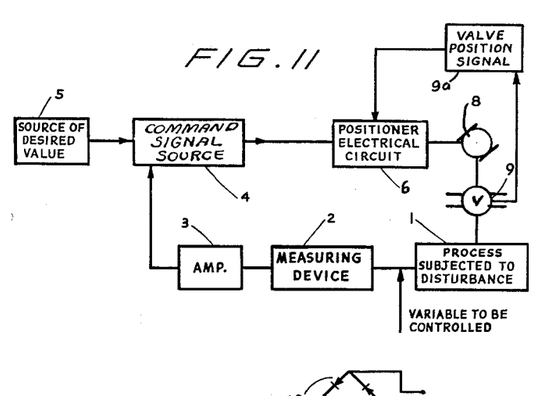
FIG. 11 is a block diagram of the various electrical components of the present invention.

Referring specifically to FIG. 11, there is shown in block arrangement, overall means of operation of the present invention. This general arrangement has been previously indicated in the above-mentioned copending application, and accordingly only a brief résumé will be made at this time. In this arrangement a particular variable, whose value is to be controlled, as previously indicated, is measured by a suitable measuring device 2, such as flow meter, pyrometer or the like. The signal thus obtained is converted to an electrical signal and is amplified through any suitable electrical network 3. These elements 2 and 3 do not form a portion of the present invention, except insofar as they are utilized to provide a proper signal to the controller and positioner amplifier. The signal, as derived from the electrical network 3, is then fed to the command signal source 4 where it is compared with respect to a desired value signal obtained from a suitable signal source 5. The differentiated and integrated output signal from this controller is then used as an input signal to the electrical circuit 6. The output of the source 4 is then representative of the desired valve position. The electrical circuit 6 compares the signal from the command signal source 4 with the signal from the valve position transducer 9a, characteristic of the actual valve position, and actuates the motor unit 8 to position the valve 9 until its position coincides substantially with that represented by the output signal from the command signal source 4.

In describing the structure and operation of the present invention, consideration will first be given to the mechanical structure of the positioner or positioning device itself, then to the electrical circuit controlling its operation, and finally to the controller unit and the modification of the invention.

For convenience, reference will be made to the use of the invention for control of a valve stem which in turn operates a valve regulating the flow of a liquid, depending upon a temperature resulting from the action of the flow of said liquid upon the process. It should, however, be clearly understood that this invention may be materially extended in usage as previously indicated.

Referring now to FIGS. 1, 2, 3 and 4, there is illustrated therein the mechanical structure of the positioner device. In this structure there is provided a casing 200, having an upper casing section 201, for the motor mechanism secured by bolts 202 to the lower casing section 203. This lower casing section encloses actuating mechanisms which are adapted to be secured to the valve stem controlling the fluid flow, and is provided with openings on either face to facilitate access to the mechanism. In this structure a motor 205 is mounted by suitable means such as posts 206, on the transversely extending plate or support 204.

As illustrated a single motor 205, capable of operating in both directions is utilized, although a pair of single directional motors arranged to cause rotation in opposite directions may also be used with suitable interconnecting gearing. As illustrated, this motor 205 has a shaft 210 with a gear 209 mounted thereon which meshes with the gear 211. The gear 211 is in turn mounted on shaft 212 and carries the pinion gear 213. This pinion gear 213, is adapted to be engaged by the gear 214, mounted on the shaft 216. This shaft 216 is journalled in and longitudinally slidable in the fixed collar 217, but is normally maintained in a position so that the gears 213 and 214 may be engaged by the action of the leaf spring 218 which contacts and presses upwardly against the lower end of the shaft 216. The spring 218 is secured to the lower side of the support 207 by a nut and bolt arrangement 219. Also mounted on the shaft 216 is a pinion gear 220 which engages the gear 221 mounted on the shaft 222.

A hand wheel 223 on the shaft 224 telescopically engages the shaft 225. The shaft 224 has mounted on it the gear 226 provided with outwardly extending flange 227 at its upper end which is adapted to engage the upper surface of the gear 214 when the shaft 224 is moved downwardly. This shaft 224, however, is normally maintained in an up position by the helical spring member 229. If desired, a spring latch arrangement 230 may be provided on the top of the casing to engage a recess or groove in the shaft 224 to insure that it is normally maintained in its upright position.

By releasing the latch 230 and pushing down on the shaft 224 the gear 214 may be disengaged from the gear 213, thus permitting a hand operation of the device hereinafter described, while at the same time insuring a complete disengagement of the motor so as to avoid any accidental operation of the device by the motor when hand operation is desired.

The shaft 222 is mounted in a bearing collar 232, which in turn is coaxially mounted in the plate 207. At the lower end of this shaft 222, is coaxially fixed a threaded shaft 235. This threaded shaft 235 has mounted upon it a non-rotatable nut 236. This threaded shaft and nut are preferably provided with ball bearing interengagements for increased efficiency. This type of screw and nut arrangement is manufactured by the General Motors Corporation, under the mark "Saginaw Ball Nut & Lead Screw."

The nut 236 is rigidly secured to the cross member 237. This cross member 237 has secured to it a pair of oppositely arranged downwardly extending parallel rods 238, which are mounted for longitudinal movement in sleeve bearings 239. At the lower end of these rods, is provided a second cross member 240, suitably secured, such as by nuts 250. Cross member 240 is provided with a centrally located sleeve 241, in which may be secured any suitable actuating type mechanism which is adapted to extend downwardly through the opening 242 to operate the valves which are being controlled. If desired, a transverse hole in the sleeve 241 may be provided for locking the mechanism placed in the sleeve in position.

The lower end of the threaded shaft 235 is fixed in a ball bearing mounting 243 in turn mounted within the lower portion 244 of a sleeve member. The ball bearing race 243 may be secured in position by a nut 245. The lower section 244 of the sleeve member, is rotationally fixed but is adapted to move vertically responding to vertical movements of the threaded shaft 235. The other portions of this sleeve member include the annular lower sleeve section 246 and the upper sleeve section 247, which are interconnected by the annular ring 248, suitably secured respectively at its inner edge to the section 247 and its outer edge to the section 246. This sleeve structure is tensioned downwardly by the loaded helical spring 251, positioned between the sleeve section 247 and the inner surface of the lower wall 203, of the casing. The lower end of this spring 251 bears against the ring 248, while the upper end of the spring bears against the wall 252 which forms the bottom surface of the upper casing section 201. Downward motion of the sleeve structure may be limited by the flange or ring 253 which is secured about the top of the sleeve section 247. An extension 254 is rigidly secured at one end to the top of the upper sleeve section 247 and extends outwardly in a position to contact the microswitch 255 and thereby actuate it upon an upward movement of this arm 254. This microswitch, as will be more clearly understood from the description further on, is connected electrically in series with the power supply to the motor when actuated.

On the sleeve 241 there is provided an adjustable arm 256 which is adapted to actuate the microswitch 257, when the sleeve is moved upwards to a limited up position. Also provided on the sleeve 241 is a rack 258, FIG. 3, spring tensioned firmly against the gear 259 by means of the leaf spring 260. The rack 258 and leaf spring 260 may be secured to the sleeve 241 by suitable means. The gear 259 is mounted on the shaft 261 which controls the potentiometer 262 at its other end. This shaft 261 may be journalled in supporting brackets on plates 263 and 264. If desired, the brackets 264 may be extended downwardly and calibrated at its edge so that the pointer 265 secured to the sleeve 241 may be used in connection with the calibrations on the plate 264 to determine an exact relative position of this sleeve and thereby the position of the valve stem or valve operated by the sleeve.

The potentiometer 262 is utilized as a position measuring or sensing device in the feedback portion of the electrical circuit which operates the motor or motors actuating the valve stem. Other position sensing devices, however, may be used, provided they are adapted to be converted to an electrical feedback signal for use in the electrical circuit as hereinafter appears. Alternate arrangements for mounting the feedback potentiometer are possible. One such arrangement consists of a five turn potentiometer mounted within housing 201 suitably provided with a gear fixed so as to mesh with gear 221.

Figures 1, 2:
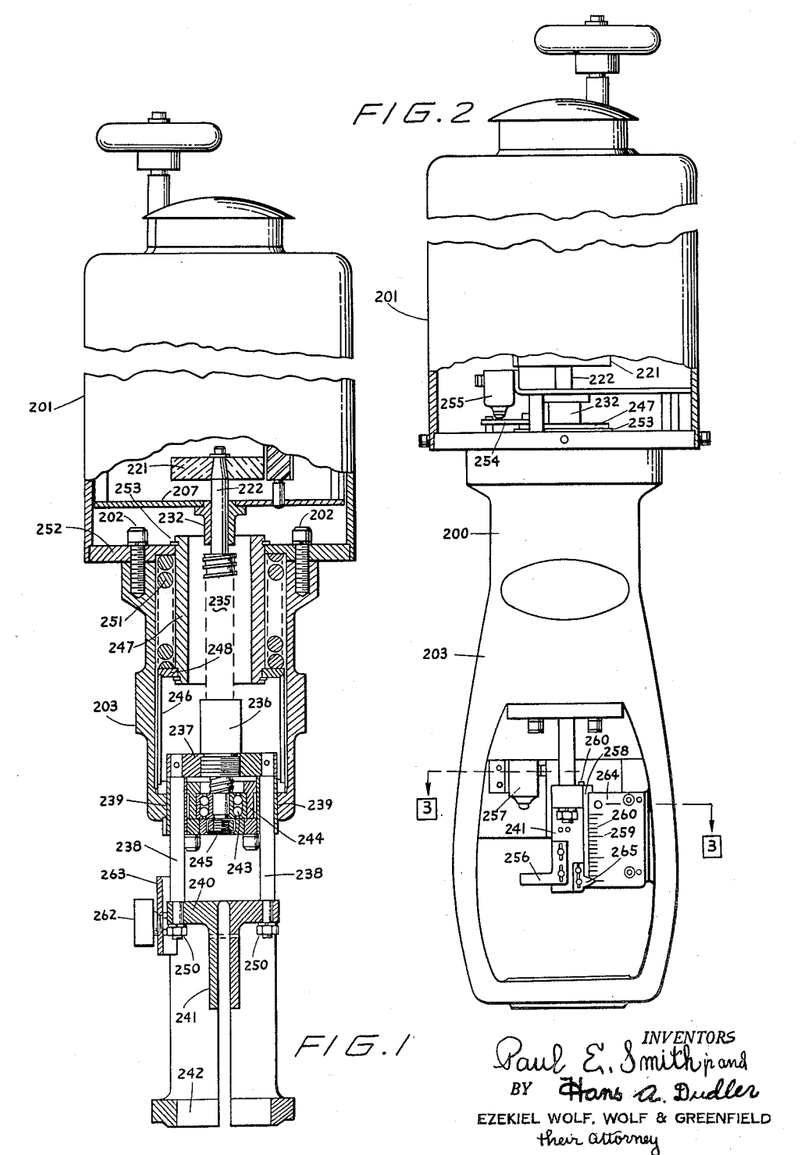
FIG. 1 is a cross sectional side elevation of the positioner mechanism.
FIG. 2 is a front elevation in partial cross section.
Figure 3:
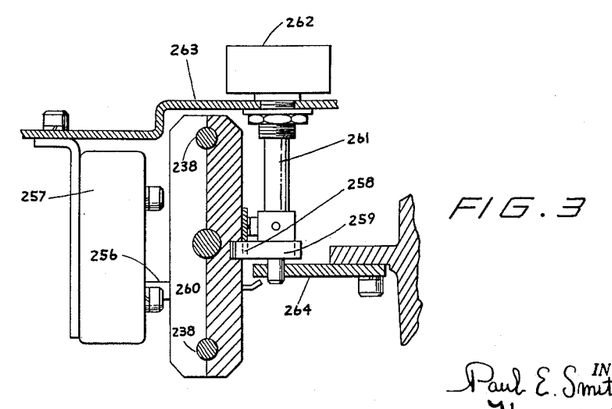
FIG. 3 is a cross section taken along the line 3—3 of FIG. 2.

The spring and rack arrangement is designed to eliminate backlash between the rack and gear without permitting wear or binding on the various elements.

Figure 4:
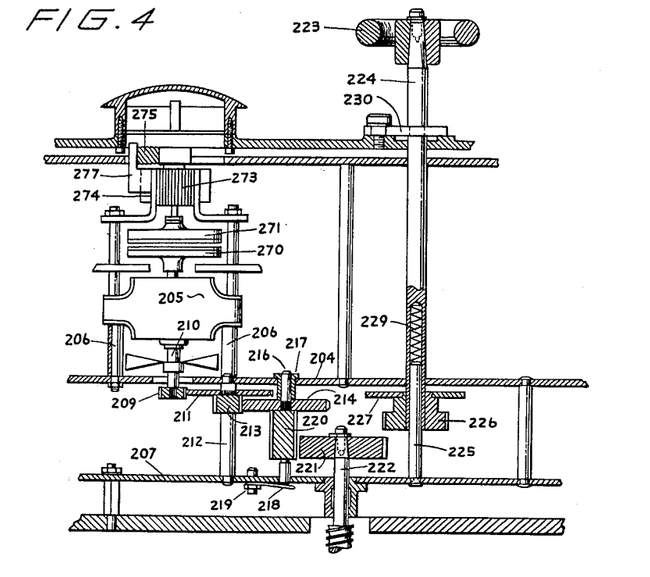
FIG. 4 is an openly folded partially cross sectional view of the motor and gearing assembly.

A braking mechanism is provided to the armature of the motor 205 by means of a brake plate and brake shoe 270 and 271 respectively, with the brake plate 270 secured to the armature shaft and the brake shoe 271 secured to the core of the solenoid 273. This solenoid 273 is mounted by suitable means. such as the bracket, stand pins and plate assembly 274, directly above the motor 205. The core of this solenoid 273 is maintained in a normal up position by the helical spring member 275 secured at one end to the core of the solenoid and at the other end to the bracket plates 277. When the core is in its normal up position, the brake shoe and the plate are disengaged, permitting free rotation of the armature and conversely where the core is in a down energized position, the brake is on.

In the operation of the mechanical portion of this invention, the motor 205 will rotate in response to an input signal in either direction dependent upon the sign of the signal, causing a consequent rotation of the threaded shaft, 235 through the gearing previously described.

When this threaded shaft rotates, the nut 236 which is rotationally fixed to the rods 238, will move up or down in response to the particular direction of rotation of the shaft 235. This will, of course, control the up and down movement of the sleeve 241, and the valve stem attached to it. The switch 257 is provided in series with the power source to the motor to limit the upward movement of the sleeve 241, for when the arm 256 contacts the switch, the power to the motor will consequently be turned off, stopping the positioner in that particular position.

In the event that the valve, valve stem or sleeve meets with some sort of obstruction on its downward movement, the continued rotation of the threaded shaft 235 causes this shaft to move upwardly in the low immobile nut 236. This upward movement of the shaft 235 carries upwardly with it through the bearings 243, the sleeve structure, including sections 245, 247 and 249. As the spring 251 bears against the ring 248 of this sleeve structure, there begins at a selected pressure, a compression of the spring 251. The force necessary to compress this spring has been previously determined at a selected value. When additional force tending to raise this sleeve structure is applied, the sleeve structure itself will begin to move upwardly against the compressing spring 251 until the extension or arm 254, FIG. 2, on the upper end of this sleeve structure engages the microswitch 255 causing the power to the motor to be cut off. Because the solenoid 273 is so connected to the power source as to be energized when the motor is cut off, the brake shoe and plate 271 and 270 will engage, preventing the motor armature from freely rotating, and thus, by braking, maintain the original force on the valve, valve stem and sleeve 241, which was being applied at the time the microswitch was actuated. Because of this the valve will remain in the exact position at which it was located when the microswitch was actuated.

Figure 5:
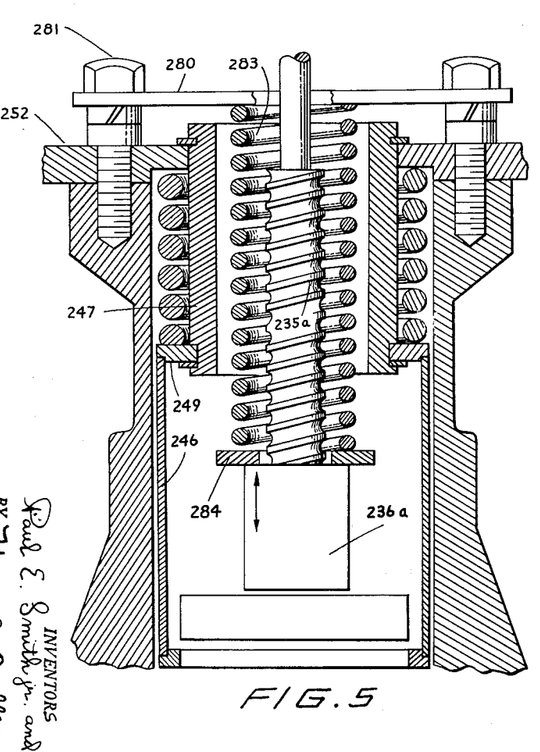
FIG. 5 is a modification of a portion of the positioner mechanism.

In the illustration of FIG. 5, there is illustrated a modification of the present invention, in which a "fail-safe" operation is provided to automatically move the valve to a downward or closed position in the event of a power failure. In this structure the nuts 236a, threaded shaft 235a, sleeve section 246, 247 and 249 are similar to those previously described. In this structure, however, a plate member 280 secured by suitable means, such as screws member 252. A helical spring 283 coaxial with the shaft 235a has one end bearing against the plate 280 and the other end bearing against the flange 284 formed on top or secured to the nut 236a. This spring tensions the nut 236a downwardly towards a closed position so that upon power failure the nut 236a and the mechanism carried by it, including the valve, will move downwardly to a closed position. In order to prevent this spring from operating during the normal operation of the positioner, causing the member 236a to move from its desired position, the electrically operated solenoid brake, illustrated in FIG. 4, is wired so that the solenoid 273 is energized to hold the brake shoe 271 against the brake plate 270 whenever the motors are not running. If the electrical power fails, however, the brake will be off, being kept off by the spring 275 which permits the spring 283 to force the nut 236a downwardly.

Figure 6:
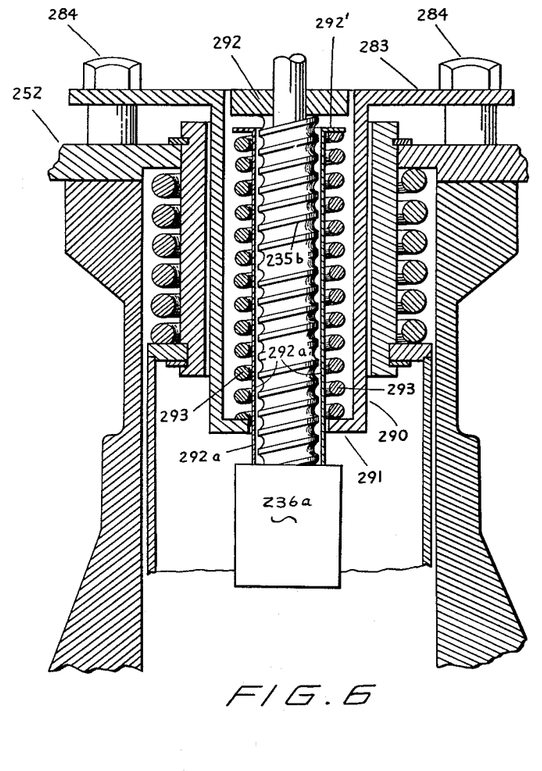
FIG. 6 is a further modification of a portion of the positioner mechanism.

In the illustration of FIG. 6, there is shown "fail-safe" modification in which the valve stem is maintained in an open position on failure of the electrical power source. In this structure a downwardly extending sleeve member 290 having an inwardly turned lower flange 291 and upper peripheral flange 283 is secured by screws and nuts 284 in spaced relation from the plate 252. Also fixed to the nut 236a is the horizontal engaging flange 292 and the upwardly extending sleeve member 292a. An expansion helical spring 293 is positioned about the screw 235b with its ends between the inwardly extending flange 291 and the flange 292, providing an upward tension to the nut 236a. Upon failure of the power in the system, this spring actuates to raise the nut 236a and consequently moves the actuating arm upwardly. In order to insure that this spring does not interfere with proper operation of the motor, a scheme similar to that described in connection with FIG. 5 is utilized. In this arrangement, however, the solenoid 273 is actuated to engage the brake shoe and brake plate only when the motor is deenergized. When, however, the motor is energized or when the electric power fails, the solenoid 273 is deenergized, permitting the spring 275 to disengage the brake and thereby permit the spring 293 to raise the valve. This operation may be obtained as in the modification of FIG. 5 by connecting the solenoid 273 in series with the terminal of the relay switches hereinafter described in connection with FIG. 7.

Figure 7:
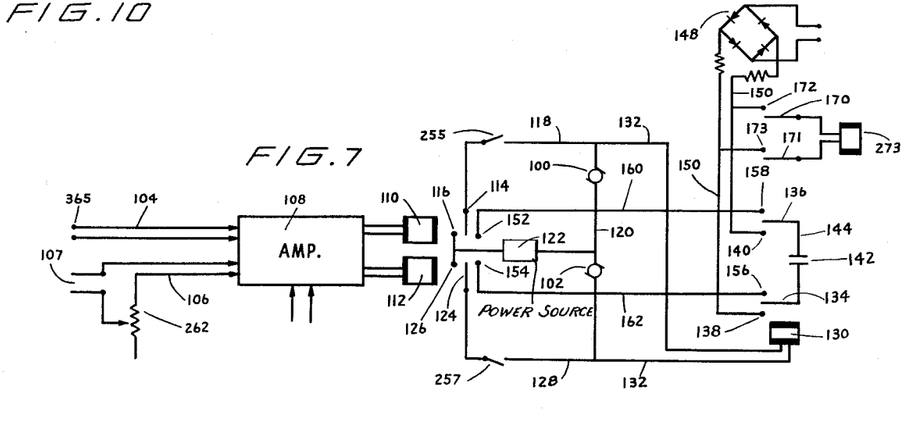
FIG. 7 is a schematic electrical circuit of the electrical means for operating the positioner.
Figures 8, 9:
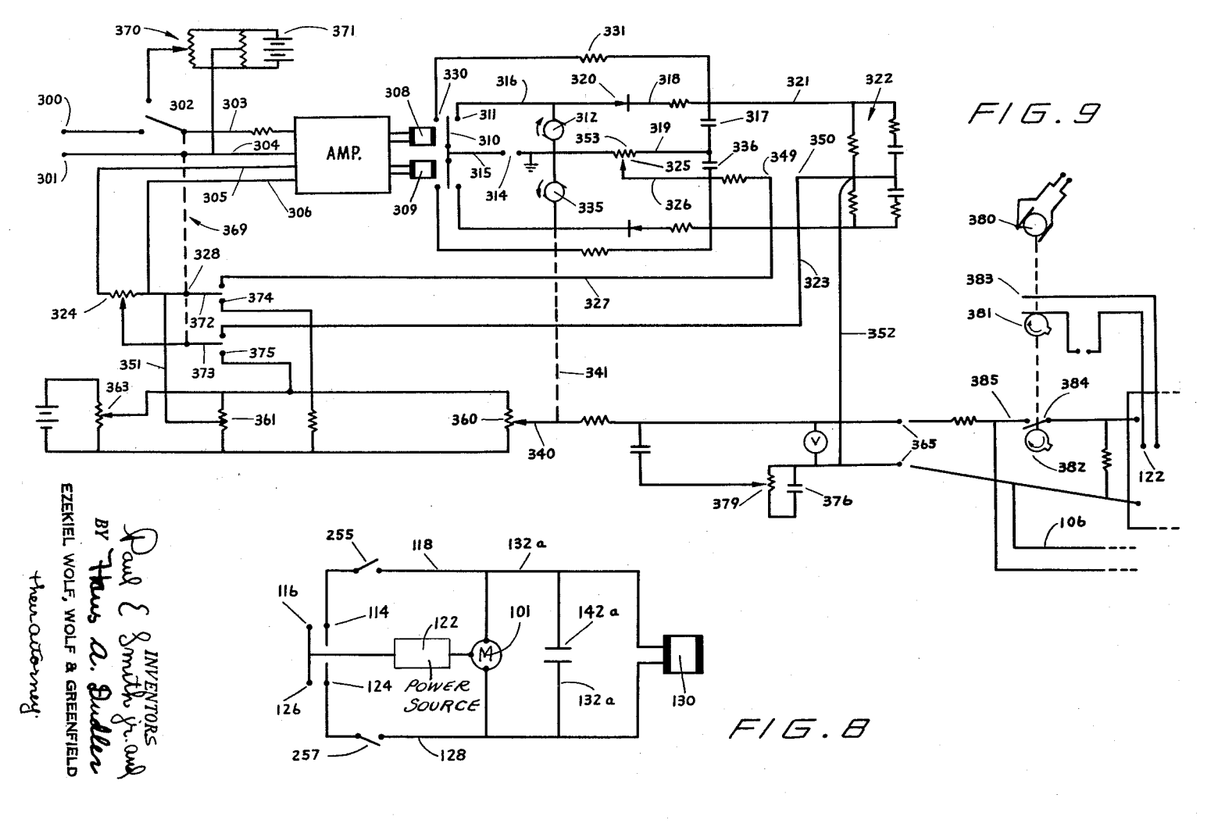
FIG. 8 is a schematic electrical circuit of a modification of the scheme shown in FIG. 7.
FIG. 9 is an electrical circuit showing the schematic arrangement of the controller used to supply a signal to the circuit shown in FIG. 7.

Reference is now made to the electrical positioner circuit illustrated in FIGS. 7 and 8. As previously indicated, the motor 205 for operating the mechanical structure may be replaced by a pair of motors, as is illustrated schematically in FIG. 7 where the motors are represented by the field windings 100 and 102. These motors 100 and 102 are mounted in tandem with preferably a common armature axis or some equivalent structure or gear train by which the screw 235 may be reversely rotated. These motors 100 and 102 are counter-revolving so as to provide this reversible rotation.

These counter revolving motors 100 and 102 are operated by a desired value input signal fed through the line 104 which is derived from the controller device hereinafter described or from any other controller capable of furnishing the signal on line 104. This desired value input signal 104 is compared with a signal derived from the actual position of the valve by such means as the potentiometer 262, previously described, which is magnitudinally adjusted by movement of the sleeve 241. The power through the potentiometer 262 in series with the lines 106 may be obtained from a suitable power source 107. An alternate arrangement of power source and potentiometer 262 may be used wherein potentiometer 262 is connected as a voltage divider. The resultant signal which is proportional, therefore, to the difference between the actual valve position and the desired valve position as indicated respectively by the output valve position signal and the desired valve input signal is amplified in the magnitude amplifier or transistor amplifier 108 to obtain either a positive or negative signal which is reflected respectively in either the relay 110 or 112 or into appropriate coil or coils of a polarized relay. If a resultant signal, for example, is obtained in relay 110, the relay switch 114 closes the relay contact 116 completing a circuit through the line 118, the motor 100, line 120 and power source 122. If, on the other hand, a signal of opposite sign is obtained in relay 112, a circuit is completed through the motor 102 by closing of the relay switch 124 to the contact 126, with the circuit being completed through the power source 122, field coils 102 and line 128. As these motors have a tendency to overrun their desired stop position, means are provided in this circuit for providing a unidirectional pulse of current through the motor windings, whereby a damping sufficient to suddenly stop the motor is obtained, and thereby prevent the motor from overrunning its desired stop position. This means comprises the relay 130 which is connected in parallel with the motors by the line 132. When either motor 100 or 102 is running, the relay 130 will also be energized. When relay 130 is energized, the relay switches 134 and 136 are closed to contacts 138 and 140 respectively. When thus connected, the condenser 142 in the line 144 between the relay switches, is connected across the direct current source such as the rectifier, as illustrated at 148. This rectifier charges the condenser 142 through the lines 150, during the time interval that the motors 100 or 102 are running. When the motors have operated so that the position of the valve stem controlled by the motor is sufficiently close to the desired position, current actuating the motor is reduced to zero by the opening of the relay switches 114 or 124. These relay switches 114 or 124 then normally close respectively to the contacts 152 or 154. Simultaneous with the deenergizing of the switches of relays 110 or 112, the relay 130 will also be deenergized permitting the switches 134 and 136 to close their normally closed positions in contact with the contacts 156 and 158 respectively. This will thereby permit the charge on the condenser 142 to discharge through the contacts 156 and 158 and lines 160 and 162, switches 114, 124, lines 118, 128 and the two motors 100 and 102, thereby producing the desired unidirectional pulse of current, which pulse provides a sufficient eddy-current damping to bring the motor to a sudden stop and thus prevent an overrunning. In this connection it should be noted that the charge on the condenser 142 is substantially proportionate to the length of time the motors 100 and 102 run, and therefore a greater charge on the condenser is available with an increased velocity of the motor.

The solenoid 273 which operates the brake on the motor 205, as previously described, is connected across the relay switches 170 and 171 which in turn will close to the relay contacts 172 and 173 respectively when relay 130 is deenergized. These contacts in turn are connected across the lines 150. Then the solenoid 273 will be energized when the motors 100 and 102 are not running. Conversely, when either motor is running and relay 130 is energized, solenoid 273 is deenergized. This solenoid will also be deenergized when power fails.

In FIG. 7 there are also illustrated the microswitches 255 and 257 adapted to cut off power to the motors in the event of overdriving the shaft 235 in either direction.

Figure 8A:
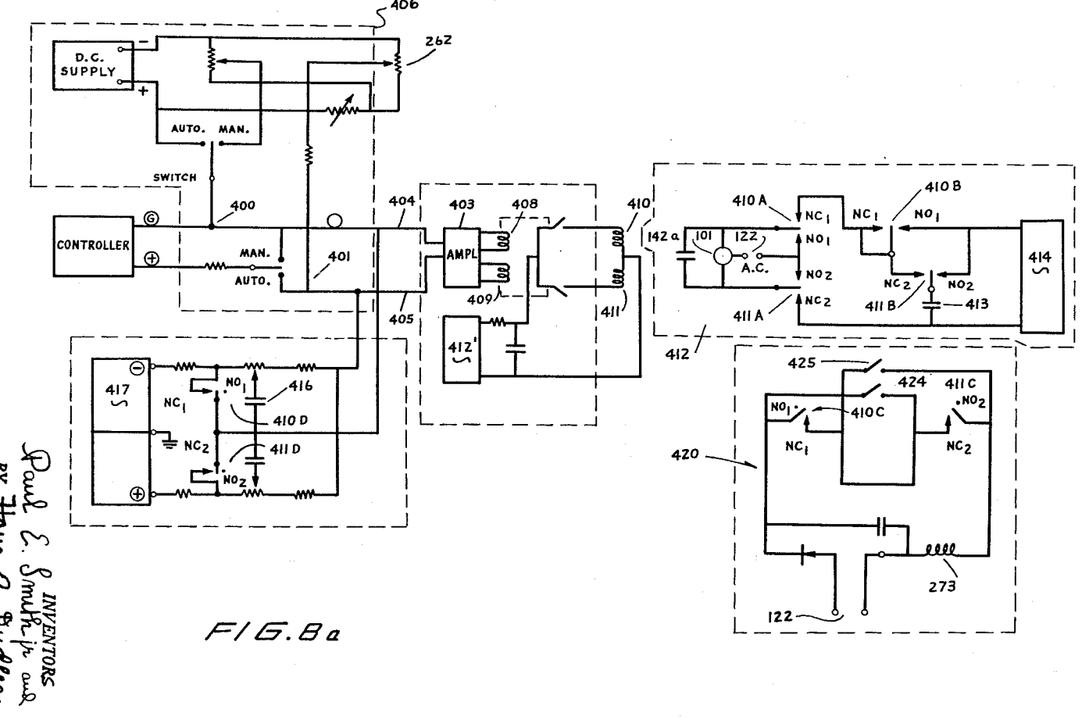
FIG. 8a is a schematic electrical circuit of another modification of a portion of the invention described in FIG. 7.

The circuit illustrated in FIG. 8 is operative in the same manner as that described in FIG. 7 with the exception that the condenser 142a is connected across the single motor through the line 132a for the purpose of providing a proper phase shift. The relay 130 is also connected across the motor 101. In this modification, the motor is driven in either direction dependent upon the source of the signal received. A further modification, which utilizes master and slave relays thus permitting the use of motors of a higher power rating, is shown in FIG. 8a. This modification shown in FIG. 8a and hereafter described is preferable.

The controller section most clearly shown in FIG. 9 provides a suitable means for deriving a signal input to the electrical portion of the positioner. This controller may derive its signal from any variable capable of being electrically measured, such as pressure, temperature, flow or thickness. These measurable quantities are, of course, utilized as a measure of the operation of some process which may be influenced by the movement of the actuated mechanism in the positioner, as for example, the flow of a liquid which might be controlled by a valve mounted on the positioner. The signal measured by the controller is compared with a fixed or variable desired value and the deviation or error between the actual value and the desired value is determined. This deviation, suitably processed, then becomes the input to the electrical positioner circuit. The desired value may be prefixed by actual human measurement or may, on the other hand, be determined by measurements or calculations obtained by some other type of controller unit. The controller unit utilized in the present invention, in addition to amplifying the deviation or error prior to feeding it into the electrical positioner circuit, also provides a means for producing the sum of three signals, one proportional to deviation, one proportional to the integral of deviation, and one proportional to the derivative of the deviation. Further, the controller may also be used for varying the proportionality factor between the deviation, its input, and its output signal to the electrical positioner circuit. This output is utilized as the input or desired value measure for the positioner mechanism previously described.

In the present circuit where the output signal provides a sum of three signals including proportional to deviation, proportional to integral of deviation and proportional to the derivative of the deviation, the input signal from the prime measuring means is received at terminals 300 and 301. This signal is transmitted through the switch 302 and lines 303 and 304 to the amplifier stage, where depending upon the signal received in the lines 305 and 306, an output signal will be obtained in either of relays 308 or 309. The lines 305 and 306 provide a feedback signal, which increases until it reaches a voltage equal to the input voltage received, through the terminals 301 and 300 thereby deenergizing the relays 308 or 309 at a desired instant. This feedback system will be more clearly described hereafter.

The resultant signal obtained by the difference between the actual signal and feedback signal may be either positive or negative and will accordingly operate either relay 308 or 309. The signal received in the relay 308 for example, will thereby close the relay switch 310 to the contact 311.

When relay switch 310 is closed to the contact 311 the motor 312 is actuated and starts to run. The power to this motor is supplied from the power source 314, through the line 315, switch 310, line 316, the motor 312, to the other side of the power source. Simultaneously with the rotation of this motor, the capacitor 317 begins to charge until it reaches a voltage approximately equal to the voltage of the input signal on the lines 303, 304. This charge in the capacitor 317 is derived through the lines 318 and 319. As the power source 314 may be A.C. voltage, a rectifier 320 is provided in the line 318. The charge built up across this capacitor 317 is discharged through the line 321, filter network 322 and line 323 to the potentiometer 324 and line 305 on one side, and, on the other side through line 319, potentiometer 325, line 326, line 327, to switch 328 and line 306. When the voltage thus derived in lines 305 and 306 equals the voltage in lines 303 and 304, relay 308 will be deenergized, thus permitting the relay switch 310 to close to its normally deenergized position to relay contact 330. When this occurs, the capacitor 317 will discharge through the resistor 331, lowering the effective voltage across this capacitor 317, and thereby reducing the feedback input signal on the lines 305 and 306. When this input signal on the line 305, 306 is reduced, the relay 308 will again be actuated, repeating the cycle previously described. Each time this relay switch 310 is closed to contact 311, the motor 312 will run. In a similar manner, if the signal derived from the difference between the signals on the lines 303, 304 and 305, 306, is opposite from that previously described, relay 309 will be actuated causing the motor 335 to be actuated in an opposite direction causing condenser 336 corresponding to condenser 317 to charge, and thereby provide a feedback signal through the lines 305, 306. Thus in the operation of the motors 312 and 335, they will run intermittently with the length of running time to off time, proportional to the input signal 370. The capacitor circuit described, insures that these motors will maintain their average velocity in proportion to the input signal on lines 303, 304. The average velocity of either motor is thereby varied from a minimum when the input in the lines 303, 304 is small, to a maximum when this input is large. Since the rates of angular rotation of the motors 312 and 335 are proportional to the input, the angular distance of rotation of the motor shafts is proportional to the integral of the velocity, or, consequently to the integral of the input of the lines 303, 304. This integral measure is converted to a voltage measure through control of the potentiometer 340, mounted directly or by suitable gears, as indicated by the dotted line 341, to the motors. As previously mentioned, the voltages across the capacitors 317 or 336, are proportional to the input on lines 303, 304, with the voltage being impressed across condenser 317 dependent upon the input of one signal across condenser 336 upon the input of the opposite sign. Consequently, the voltage across points 349 and 350, is proportional to the input and is therefore used as a proportional signal. This signal is impressed on the output through the lines 327 and 323, and the lines 351 and 352. In addition to this proportional signal, there is impressed a simultaneous derivative signal which is obtained by measurement of the average current into either the capacitor 317 or 336. This is obtainable as the capacitors 317 and 336 have a voltage across them which is proportional to the input. Because of this, the average current into either of these capacitors is proportional to the derivative of the voltage across them and consequently, the average current into the capacitors is proportional to the input. Therefore, by providing a resistor 353, which may be in the form of a potentiometer, in the line 319, and tapping it through the line 326, a measure of the current into either of the capacitors 317 or 336 may be obtained. Since the voltage across this resistor 353 is proportional to the current into the capacitors, it is consequently proportional to the derivative of the input signal in lines 303, 304. This derivative signal is thereby fed back to the output along with the proportional signal. This derivative feedback signal, it may be noted, has an additional stabilizing effect in the circuit.

Thus, the integral signal obtained across the resistance 360 is added to the proportional and derivative signal obtained across the resistor 361, which as stated is tapped from the line 351. The derivative signal may be varied and adjusted by the potentiometer 325 and the proportional signal used in the feedback may be adjusted by the potentiometer 324. Potentiometer 363 is used to adjust the integral signal. These signals are thereby summed and impressed across the output 365. This output 365 is used as the desired input to the electrical positioner circuit, FIG. 7.

Provision is made in this circuit for a manual adjustment operative through the gang switch 369, which when actuated, will disconnect the input signal across the lines 300 and 301, and connect the input signal lines 303, 304 of the amplifier to the manually operated input potentiometer 370. This input potentiometer having an adjustable power supply 371, thereby provides an adjustable input signal which will operate the motors 312 and 335 as servo motors. Simultaneously, with the switching to a manual input, the feedback circuit is disconnected at the switches 372 and 373, with these switches engaging contacts 374 and 375 respectively. This connection thereby provides a feedback to the amplifier which is proportional to the angular rotation of the motors 312, 335. This signal is not proportional to the integral of the input, nor is there any derivative feedback. When the proper manual adjustment is achieved and the input signal 303, 304 reduced to zero, the switch 369 may be placed to its normal "on" position without altering the output voltage at the terminal 365 which had previously been kept equal to the input of the amplifier by the servo action of the motors. In this manner a bumpless transfer is effected.

The output 365 may be adjusted about a zero calibration by varying the potentiometer 379 supplied by the suitable power source 376. This output 365 may be used as a direct and continuous input to the electrical positioner circuit of FIG. 7, or may first be fed through a sampler circuit which will limit the input signal to the electrical positioner circuit to a periodic sample. This sampler circuit is shown as a portion of the circuit of FIG. 9. In this operation, a timer motor 380 operates the cams 381 and 382, which periodically open and close in synchronism, the switches 383 and 384 respectively. When the switch 384 is closed current will pass through the line 385 to impress the input signal on the positioner circuit with the feedback being applied through the lines 106. Simultaneously, the opening and closing of the switch 383 will open and close the A.C. power source 122, which operates the motors 100 and 102. By this circuit, the output of the controller unit, will be introduced periodically as the input to the positioning device with a simultaneous observation being made of the positioning device output 106 previously described, through the operation of the timer operative cams. If the value of the integral of deviation is different, from the value indicative of the actual position, the electrical positioner circuit of FIG. 7, will operate so as to provide correspondence. The proportionality factor of the integrating mechanism is suitably adjusted by the potentiometers previously described, so that a properly stable system of operation is achieved in the sampling operation. Further the repetition rate of the sampling device may also be adjusted to insure stable operation by proper choice of a timing cycle. The mode of control is such that if the integral of the deviation at the $n$th sampling time is unchanged from the $(n-1$th$)$ time indicating zero average deviation between the $(n-1$th$)$ and the $n$th instant, no corrective action will be taken. It provides accurate control without unnecessary actuation of the positioner in times between sampling. Such control can be stable in the presence of large time delays or transportation lags in the process or device whose output is influenced by the position of the device controlled in the positioner previously described.

Figure 10:
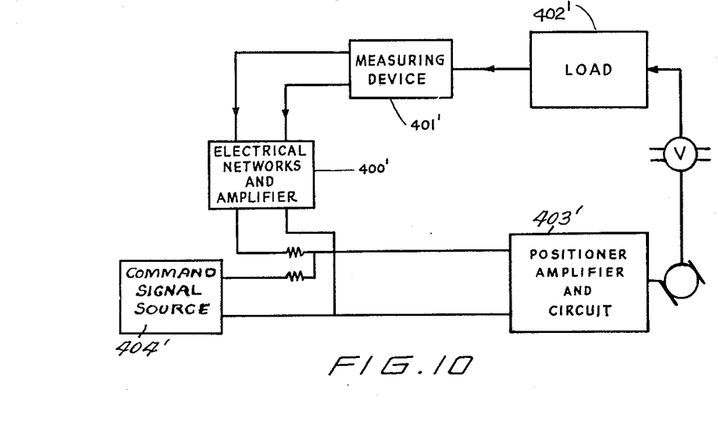
FIG. 10 is an electrical block diagram showing a further modification of the invention.

As an additional means of control, the added circuit illustrated in FIG. 10 may be utilized. With the realization that the deviations between the process variable actual value, for example, temperature, and the desired value, are due to the effect of disturbances, such as environmental conditions, varying throughputs (production rates), varying raw material properties, varying demands and the like, an improvement in control action may be obtained by measuring said disturbing effects and adding a signal of properly chosen proportionalities to the signal previously described at the input to the electrical positioner circuit. The added load or disturbance compensating signal is introduced in such a fashion as to cause the positioned member to move to such a position as to completely neutralize the disturbance. In order to aid in rapidly neutralizing the signal, a signal proportional to the first or higher derivatives of the disturbance may be added as an input to the positioner itself. Such a control is illustrated in FIG. 9 and includes in its structure an electrical network and amplifier 400', connected to a measuring device 401', which is utilized to measure the deviations in the load or disturbance 402'. The signal in this electrical network and amplifier 400' is fed to the input of the positioner amplifier 403' in parallel with the output of the command signal source 404' as is schematically illustrated in this figure. This added load or disturbance thereby provides a compensating signal which will cause the positioned member to move to a new position to completely neutralize the disturbance.

In FIG. 8a there is shown an improved schematic circuit for operation of the present invention. In this circuit, the potentiometer 262 measures the actual output signal in a manner as previously described in connection with the description of the valve positioner itself. The voltage derived through this potentiometer 262 is added to control signal derived from the controller through the lines 400 and 401. The potentiometer 262 forms a portion of the circuit illustrated in the enclosure 406. This circuit permits either a manual or an automatic actual output signal to be added to the controller. The controller and actual output level signal are fed across the lines 400 and 401 to the lines 404 and 405 which are the input lines to the amplifier 403. The signal derived and fed into the amplifier 403, when it exceeds a certain value, will cause a current to flow in either one or the other of the slave relay coils 408 or 409. This in turn will cause the switch or contact associated with that particular coil to close, actuating the relay coil 410 or 411 depending upon whether coil 408 or 409 was the one actuated by the amplifier. When either of coil 410 or 411 are energized, all the contacts associated with that particular coil will be moved from one position to another in the manner described hereinafter. Thus, if coil 410 were actuated, the switch 410a will close from $no_1$ to $no_1$ causing a current to flow through the motor 101 from the power source 122, completing the circuit through the switch 410a. This thereby energizes the motor 101 which will rotate in a direction to reduce the error signal input into the amplifier 403. Simultaneously, the switch 410b will close from point $no_1$ to $no_1$. This will permit the condenser 413 to charge from the power source 414 with current being supplied through contact $no_1$ of switch 410b and $no_2$ of switch 411b. This latter switch 411b is normally closed to $no_2$ when current is not flowing through the relay coil 411. This condenser 413, which acts as a damping condenser, will charge during the time interval that the motor 101 is running. As soon as power to the motor 101 is cut off by the reduction of the input signal to the amplifier 403, the condenser 413 will be connected across the terminals of the motor. This occurs when the switch 410b closes to contact $no_1$. The consequent discharge of the damping condenser 413 through the motor will cause it to stop immediately. Simultaneously, with the charging of damping condenser 413, the compensation circuit condenser 416 will also charge. This compensation circuit 416 has its output connection across the lines 404 and 405 and its output forms a portion of the input into the amplifier 403.

A condenser 416 will charge during the charging of the condenser 413 with D.C. power being derived from the source 417. This power is applied across the condenser 416 when the switch 410b is in the $no_1$ position. When the coil 410 is deenergized, the switch 410b will return to the $no_1$ position, permitting the condenser 416 to discharge into the lines 404 and 405. Also illustrated in the circuit is a solenoid control circuit 420. In this circuit the solenoid 273 is used to hold the brake previously described in an "on" position, when the A.C. power supply is on. If the A.C. power supply 122 fails, the brake is off and the fail safe springs cause the valve to open and close, depending upon which arrangement is used in the manner previously described.

When the motor 101 is operating in either direction, the switch 410c or 411c will be in its $nc_1$ position or $nc_2$ position, that is, open. This will result in an open circuit through the solenoid 273 and the brake will be off. It should be noted that contacts 425 and 424 are normally open. When the motor 101 is not operating and the valve is in its proper position, current will be supplied through the solenoid 273 and the switches $nc_1$ and $nc_2$ which will then be in a closed position. This will actuate the brake and thereby maintain the valve in a locked proper position.

The contacts 425 and 424 are a second set of contacts in the open limit and force limit switches provided in the valve to limit the motion of the valve stem. When the valve is closed and the force limit and microswitch become actuated, contact 424, 425 whichever is appropriate, is closed. At this time, this contact, as for example, contact 424, corresponds to the closing direction of the motor and will be closed. This completes a circuit through the solenoid 273 which will result in the brake being held on, thus keeping the valve in its closed or open position, as the case may be. When the valve moves from this limiting position, the switch or contact 424 or 425 will open, thus releasing the brake and allowing normal operation.

The corresponding switches on the relay 411 act in the same manner by a signal in the amplifier 403 of opposite phase from that in relay coil 410.

What is claimed is:

1. In a positioner device of the type described a threaded shaft, means supporting said shaft for rotation and longitudinal movement, means for rotating said shaft, a nut threaded thereon adapted to be moved longitudinally by rotation of said shaft, means for restraining said nut from rotation, a sleeve member coaxial with said shaft, bearing means fixing said sleeve member to said threaded shaft, and spring means engaging said sleeve member for tensioning said shaft in a longitudinal direction, said sleeve member adapted to be moved longitudinally on longitudinal movement of said shaft against the tension of said spring means for engaging a switch mechanism.

2. In a positioner device of the type described a threaded shaft, means supporting said shaft for rotation and longitudinal movement, means for rotating said shaft, a nut threaded thereon adapted to be moved longitudinally by rotation of said shaft, means for restraining said nut from rotation, a sleeve member coaxial with said shaft, bearing means fixing said sleeve member to said threaded shaft, and a loaded spring means engaging said sleeve member for maintaining said shaft in a fixed longitudinal position over a selected range of longitudinal forces applied to the shaft, said sleeve member adapted to be moved longitudinally on longitudinal movement of said shaft against the tension of said spring means for engaging a switch mechanism.

3. A positioner device of the type described in claim 2, having an actuator arm fixed to said nut with a gear mechanism operatively engaging said arm for controlling an electrical circuit adapted to determine the position of said arm.

4. A positioner device of the type described in claim 2, wherein said nut is maintained nonrotatable by an actuator arm secured thereto and mounted for longitudinal movement in a fixed bearing member.

5. A positioner device of the type described for moving an actuator member between an open and closed position comprising a freely rotatable screw maintained in a normally fixed longitudinal position, a non-rotatable nut threaded on and adapted to be moved longitudinally by rotation of said shaft and operatively controlling said member, motor means for rotating said screw, a control mechanism for said motor means adapted to be engaged respectively by longitudinal movement of said screw and movement of said actuator member, said motor means having an armature shaft in engagement with said screw, electric means for braking the rotation of said armature shaft when said motor is inoperative, and means for moving said nut to an extreme position when the power to said electric means fails.

6. In a positioner device as set forth in claim 5, wherein said motor means has an armature shaft in engagement with said screw, a brake mechanism mounted on said shaft and operatively engaged by an electric means when said motor is disengaged, and spring means engaging said nut adapted to move it to an extreme position when the power to the electric means fails and said motor is disengaged.

7. A positioner as set forth in claim 5, having a hand operable mechanism for rotating said shaft and means for disengaging said motor means from said shaft when said hand operable mechanism is in operation.

8. In a positioner as set forth in claim 2, wherein said means for rotating said shaft comprises a motor, said motor having an armature shaft, a brake mechanism operatively connected to said armature shaft, electrical means for applying said brake mechanism when said motor is inoperative, and spring means normally maintaining said brake mechanism inoperative.

References Cited in the file of this patent

UNITED STATES PATENTS

| | | |
|---|---|---|
| 1,903,230 | Stewart | Mar. 28, 1933 |
| 2,007,658 | Panish | July 9, 1935 |
| 2,490,040 | Frerer | Dec. 6, 1949 |
| 2,951,974 | Silver | Sept. 6, 1960 |

OTHER REFERENCES

Thaler, G. J., and Brown, R. G.: Analysis and Design of Feedback Control Systems, page 579, FIG. C-1; McGraw-Hill, New York, 1960.